United States Patent
Donovan

(10) Patent No.: US 9,454,720 B2
(45) Date of Patent: Sep. 27, 2016

(54) METHOD AND SYSTEM FOR HALFTONE PRINTING

(75) Inventor: David Herbert Donovan, San Diego, CA (US)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 0 days.

(21) Appl. No.: 14/351,852

(22) PCT Filed: Oct. 31, 2011

(86) PCT No.: PCT/US2011/058656
§ 371 (c)(1),
(2), (4) Date: Apr. 14, 2014

(87) PCT Pub. No.: WO2013/066303
PCT Pub. Date: May 10, 2013

(65) Prior Publication Data
US 2015/0103380 A1    Apr. 16, 2015

(51) Int. Cl.
*G06K 15/00* (2006.01)
*G06K 15/02* (2006.01)
*G03G 15/04* (2006.01)
*H04N 1/405* (2006.01)
*H04N 1/52* (2006.01)

(52) U.S. Cl.
CPC ..... *G06K 15/1881* (2013.01); *G03G 15/04027* (2013.01); *G06K 15/1878* (2013.01); *H04N 1/405* (2013.01); *H04N 1/52* (2013.01)

(58) Field of Classification Search
None
See application file for complete search history.

(56) References Cited

U.S. PATENT DOCUMENTS

| | | | | |
|---|---|---|---|---|
| 3,742,129 A * | 6/1973 | Roberts et al. | | 358/534 |
| 5,235,435 A * | 8/1993 | Schiller | | 358/3.07 |
| 5,394,252 A | 2/1995 | Holladay et al. | | |
| 5,422,742 A * | 6/1995 | Ostromoukhov et al. | | 358/536 |
| 5,812,744 A | 9/1998 | Allebach et al. | | |
| 6,956,670 B1 * | 10/2005 | Dittrich et al. | | 358/1.9 |
| 7,046,397 B2 | 5/2006 | Loce et al. | | |
| 7,430,064 B2 * | 9/2008 | Bai et al. | | 358/3.06 |
| 7,471,418 B2 | 12/2008 | Robinson | | |
| 7,719,722 B2 | 5/2010 | Sharma et al. | | |

(Continued)

FOREIGN PATENT DOCUMENTS

WO    WO-2005112431 A1    11/2005

OTHER PUBLICATIONS

Supplementary European Search Report dated Dec. 4, 2014 for European Application No. EP11874977.

*Primary Examiner* — Dung Tran
(74) *Attorney, Agent, or Firm* — HP Inc. Patent Department

(57) ABSTRACT

A method for halftone printing of an image may include receiving image data of an image to be printed. The method may also include processing the image data to generate, for each printing element of a plurality of printing elements which are designed to sharingly print a single color component of a color space, or for each pass of a single printing element which is designed to pass a plurality of passes over a single print area when printing that color component, a halftone pattern for the image for that color, that was independently generated for that printing element or for that pass. The method may further include printing, by each printing element of the plurality of printing elements or in each pass of a single printing element, the halftone pattern that was independently generated for that printing element or for that pass.

16 Claims, 4 Drawing Sheets

(56) References Cited

U.S. PATENT DOCUMENTS

| | | |
|---|---|---|
| 7,808,674 B2 | 10/2010 | Saquib et al. |
| 7,826,095 B2 | 11/2010 | Wang et al. |
| 7,959,259 B2 | 6/2011 | Yamaguchi et al. |
| 8,855,445 B2 * | 10/2014 | Yamada ............... 382/298 |
| 2004/0165202 A1 * | 8/2004 | Nakagawa ............ 358/1.9 |
| 2004/0218222 A1 | 11/2004 | Damera-Venkata |
| 2006/0103689 A1 * | 5/2006 | Vinas ............ G06K 15/102 347/15 |
| 2006/0120787 A1 | 6/2006 | Abello |
| 2007/0002410 A1 * | 1/2007 | Majewicz ............ 358/534 |
| 2008/0036811 A1 * | 2/2008 | Heydinger ............ 347/15 |
| 2008/0303852 A1 | 12/2008 | Serra et al. |
| 2009/0167803 A1 | 7/2009 | Uchiyama et al. |

* cited by examiner

METHOD AND SYSTEM FOR HALFTONE PRINTING

BACKGROUND

Halftone printing is a printing technique that simulates continuous tone using dots varying in size, shape and/or distribution.

Halftone techniques are widely used in color printing, combining different color screens. In order to avoid undesired moiré pattern artifacts, the screens are rotated in relation to each other. By varying the density of the four primary printing colors (cyan, magenta, yellow and black—CMYK) any desired shade may be reproduced. Commonly, the rotation angles are standardized angles, and as a result of these angles the dots of the different colors at a specific location on the print appear slightly shifted with respect to each other.

Different dot shapes may be used in halftone printing. Round dots are most common, but elliptical dots and square dots are also widely used.

BRIEF DESCRIPTION OF THE DRAWINGS

Examples of the present invention are described in the following detailed description and illustrated in the accompanying drawings in which.

DETAILED DESCRIPTION

Digital printing devices can produce high quality images by carefully arranging halftone patterns. For inkjet printers and other binary printing devices, halftoning is usually of the frequency modulated (FM) or stochastic type, where the dots are placed at fairly uniform distances from each other within a local region, producing a smooth, uniform appearance. Typically all of the image data is processed at once to generate a halftone pattern, even if some of the halftone pattern may be printed by different printing elements (different printheads or print bars), or at different times (different print passes).

If misregistration occurs between these print elements or print passes, dots will no longer land in their intended locations, and the resulting print will have dots with non-uniform spacing, which may look very grainy.

Figure 1:
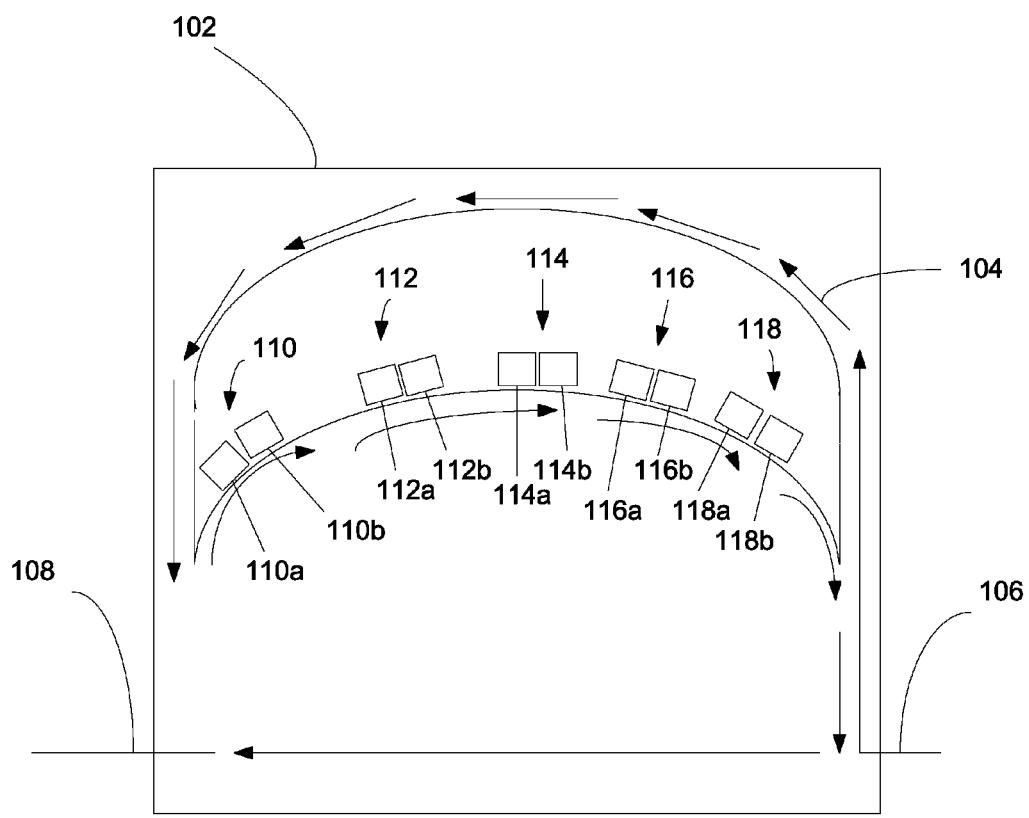
FIG. 1 schematically illustrates a printer for printing on a web.

FIG. 1 schematically illustrates a printer for printing on a web. Printer 102, such as, for example, any of the printing engines of HP T300 Color Inkjet Web Press marketed by Hewlett Packard Company (HP), includes a web path 104 along which web 106 is made to pass. Web 106 is subjected to printing by various printing element assemblies, such as, for example, Bonding Agent (BA) printing element assembly 110, which includes printing bars 110a and 110b, black (K) printing element assembly 112, which includes printing bars 112a and 112b, yellow (Y) printing element assembly 114, which includes printing bars 114a and 114b, magenta (M) printing element assembly 116, which includes printing bars 116a and 116b and cyan (C) printing element assembly, which includes printing bars 118a and 118b. Each color printing element assembly is designed to print a halftone pattern for that color. Each printing bar may include one or several print heads (in the HP T300 Color Inkjet Web Press each print bar includes seven print heads). "Color", in the context of the present specification, refers to any of the color components of a color space that is used for printing an image, unless expressly stated otherwise.

Typically image data pertaining to an image that is to be printed by printer 102 would be processed and halftoned, generating four halftone patterns —one halftone pattern for each color. Then, each pair of printing bars of each color would be used to print the halftone pattern for that color. The printing bars of each pair of printing bars designated to print a single color would share the printing of the halftone pattern for that color. Typically, the dot pattern resulting from the halftone process is divided up between print elements or print passes using a print mask, a binary pattern that undergoes logical AND operation with the data pattern to produce the data for an individual printing element or a single pass. Printing elements (e.g. print bars) may span partially or fully across the printer, so each may address the same printing locations, though at different times.

Thus, in the case of a tandem configuration (two printing bars for each color), half of the halftone pattern of a single color would be printed by one of the printing bars and the other half of the halftone pattern would be printed by the other bar. This calls for precise alignment between the bars, as in the case of misalignment (misregistration) the quality of the printed image may be degraded becoming grainy.

In another example, as is currently the case with most home and office inkjet printers, a printer may include a single printing element for each color, which is designed to perform two (or more) passes over a single print area to print a halftone pattern of the image to be printed for that color on the print area.

In the case of a printer of the latter example, image data pertaining to the image which is to be printed would be halftoned such that a halftone pattern for each color would be generated. The halftone pattern for each color would then be printed by the printing element designated for that color in two or more passes.

Multiple printing elements printing a single halftone color pattern or a single printing element that makes more than one pass when printing a single halftone color pattern are prone to misregistration problems, as there may be errors in the movement of the media and/or printing elements (e.g. , print bars, printheads) between printing events, or there may be residual errors in the alignment of printing elements with respect to each other, which may result in degraded print quality due to artifacts, such as, for example, grainy texture or appearance of a moiré pattern.

To-date, this problem has been addressed by trying to improve the mechanical design of printers to meet precision tolerances on the placement of dots in order to avoid misregistration, resulting in more expensive and complicated printers with tighter manufacturing tolerances that are difficult to achieve.

When this was not possible, image processing of data to generate halftone patterns was modified to add noise (intentional dot misplacements, usually resulting in grain) to conceal dot placement problems. Large analog presses and digital presses with adjustable dot sizes typically use amplitude modulation halftoning, and use a different screen angle for each color, which minimizes the effect of misregistration, but produces lower quality (grainier) output, with artifacts known as rosettes.

Figure 2:
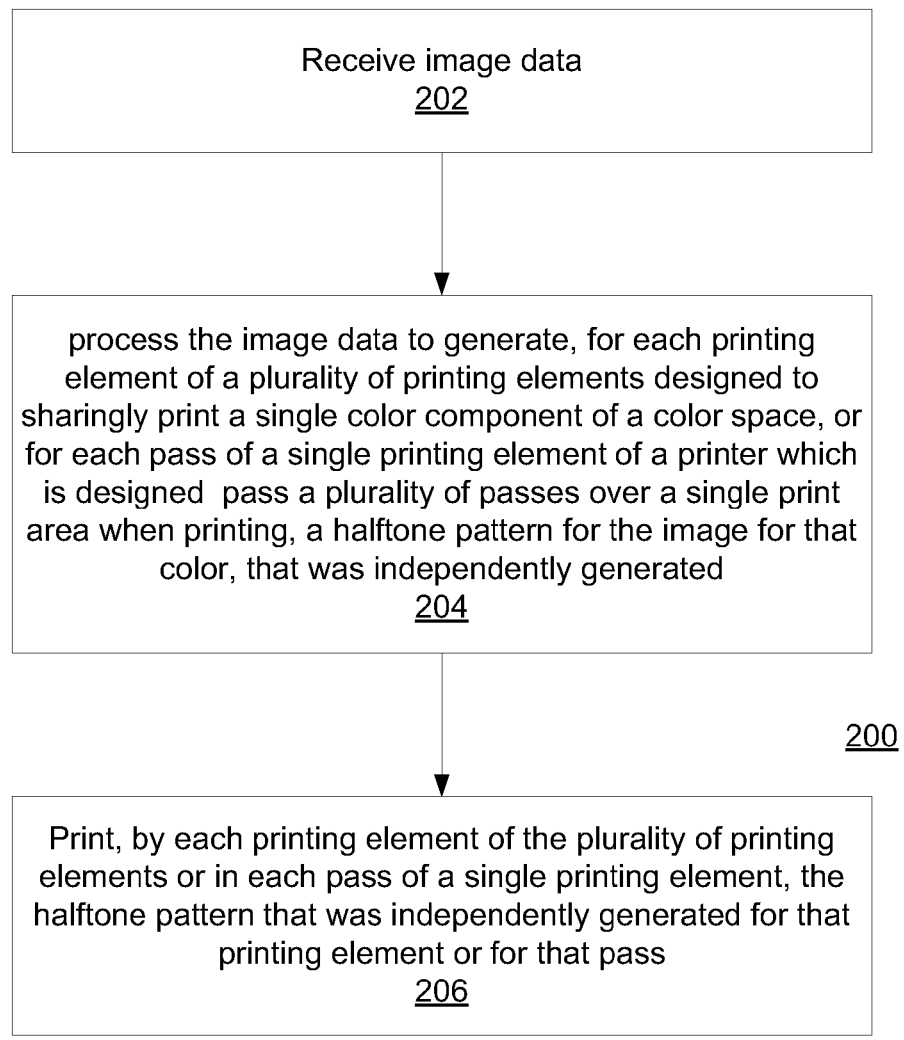
FIG. 2 illustrates a method for printing in accordance with an example of the invention.

FIG. 2 illustrates a method 200 for halftone printing in accordance with an example of the invention.

Method 200 may include receiving 202 image data of an image to be printed. Method 200 may also include processing 204 the image data to generate, for each printing element of a plurality of printing elements of a printer which are designed to sharingly print a single color component of a color space, or for each pass of a single printing element of a printer which is designed to pass a plurality of passes over a single print area when printing that color component, a halftone pattern for the image for that color, that was independently generated for that printing element or for that pass. Method 200 may further include printing 206, by each printing element of the plurality of printing elements or in each pass of a single printing element, the halftone pattern that was independently generated for that printing element or for that pass.

In order to eliminate, or at least greatly reduce, misregistration effects, it is suggested, in accordance with some examples, to print, by each printing element of a single color printing element assembly, or at each pass of a single printing element of a printer which is designed to print that color, that is to pass more than once over a single print area when printing, a halftone pattern for the image for that color, that was independently generated for that printing element, or for that pass. Without limiting the meaning of the term "printing element", it is understood that a "printing element" typically refers to a printing assembly including a plurality of dot printing members (e.g. inkjet nozzles) designed to print a dot pattern which is a part of or an entire halftone pattern of an image to be printed, and which is well positioned and controlled relative to its constituent dot printing members, but which may be less well positioned or controlled relative to other printing elements.

An independently generated halftone pattern for each printing element of a plurality of printing elements which are designed to sharingly print a single color component of a color space, or for each pass of a single printing element which is designed to pass a plurality of passes over a single print area when printing that color component may be generated in various ways.

In an example, a different halftoning methods may be used in the generation of each independent halftone pattern. Different halftoning methods may include (a) changing randomization seed value(s), (b) changing error distribution coefficients or other parameters of the halftoning algorithm, (c) changing pixel processing order for serial halftoning techniques (eg. Serpentine vs. unidirectional), (d) changing start location for serial halftoning techniques (eg. top left vs. top right pixel), (e) using an independent pixel expansion matrix per print element if halftoning at less than full print resolution. Methods (a) and (b) can apply to both error diffusion techniques, or to the algorithms used to generate matrix halftone matrices.

In another example, generating an independently generated halftone pattern may be achieved by transforming the image data. This may include, for example, (a) flipping or rotating the image data before halftoning, and performing a reverse transform after halftoning, (b) changing the initial alignment of the halftoning matrix with respect to the image data for each print element or for each pass., (c) splitting the image data into unequal pieces before halftoning (e.g. on a pixel by pixel basis), dividing the original data values into N unequal pieces used to construct N unique image data for N print elements. This could easily be done using unique linearization for each print element, or could be done after linearization as a separate step.

In doing so, it is ensured that the halftone patterns generated for each of the printing elements of the single color printing element assembly, or for the printing element which is designed to pass more than once over the print area when printing, have no particular relationship between them. Thus, in case of misregistration between the printing elements of a single color printing element assembly, the printed image remains smooth, and may only become slightly blurry. The quality of an image printed this way may present a noticeable improvement in quality with respect to a print of the same image which is printed using a single halftone pattern for each color each of which is printed by a plurality of printing elements or in a plurality of passes of a single printing element.

For example, independently generated halftone pattern may be generated for each printing element of a single color printing element assembly or for each pass of a single printing element by running the image data of the image to be printed through a separate linearization and halftoning process multiple times with a modified linearization function. According to an example, a sum of the modified linearization functions for each printing element of the plurality of printing elements or each of the passes of the plurality of passes equals an original linearization function—e.g. the values of an original linearization function may be divided by the number of printing elements in the system (eg. for a 2-bar web press, we would divide all the values in half).The image data may then be linearized and halftoned once for each print element by a method that produces a different halftone pattern for each print element. According to one example, the initialization values of the halftoning algorithm (e.g., error weight distributions, the starting location, pixel sequence for serial halftoning techniques, matrix to data offset for matrix halftoning, in addition to randomized seed values) may be modified.

In another example, the "conventional" linearization may be split in a non-equal fashion between each printing element, and separate post linearization data images generated for each printing element. This alternate approach may in some cases be sufficient to guarantee a unique independent halftone pattern for each printing element, or if necessary one of the preceding methods may also be used in conjunction with this to ensure unique halftoning results. The halftone patterns may then be then printed by their respective print elements without further processing or masking.

According to another example, the image data may be flipped or rotated prior to halftoning, for one or some of the plurality of printing elements (in the case of a plurality of printing elements printing the same color) or for one or some passes of the plurality of passes (in the case of a single printing element that passes more than once during the printing on a print area), then flipped or rotated back after halftoning.

According to an example, processing of the image data of the image to be printed to produce independent halftone patterns for each color may be carried out at the desired final print resolution. If halftoning at a lower resolution, it may be sufficient to use independent pixel expansion matrices in the generation of the independent halftone pattern for each of the printing elements. In other examples, the use of independent pixel expansion matrices may be combined with one or more of the previously described halftone techniques.

Aspects of the invention may include using independent pixel expansion matrices with a traditional single halftone print process.

By employing the method described herein seamless division of printing tasks between different printing elements may be achieved.

Figure 3:
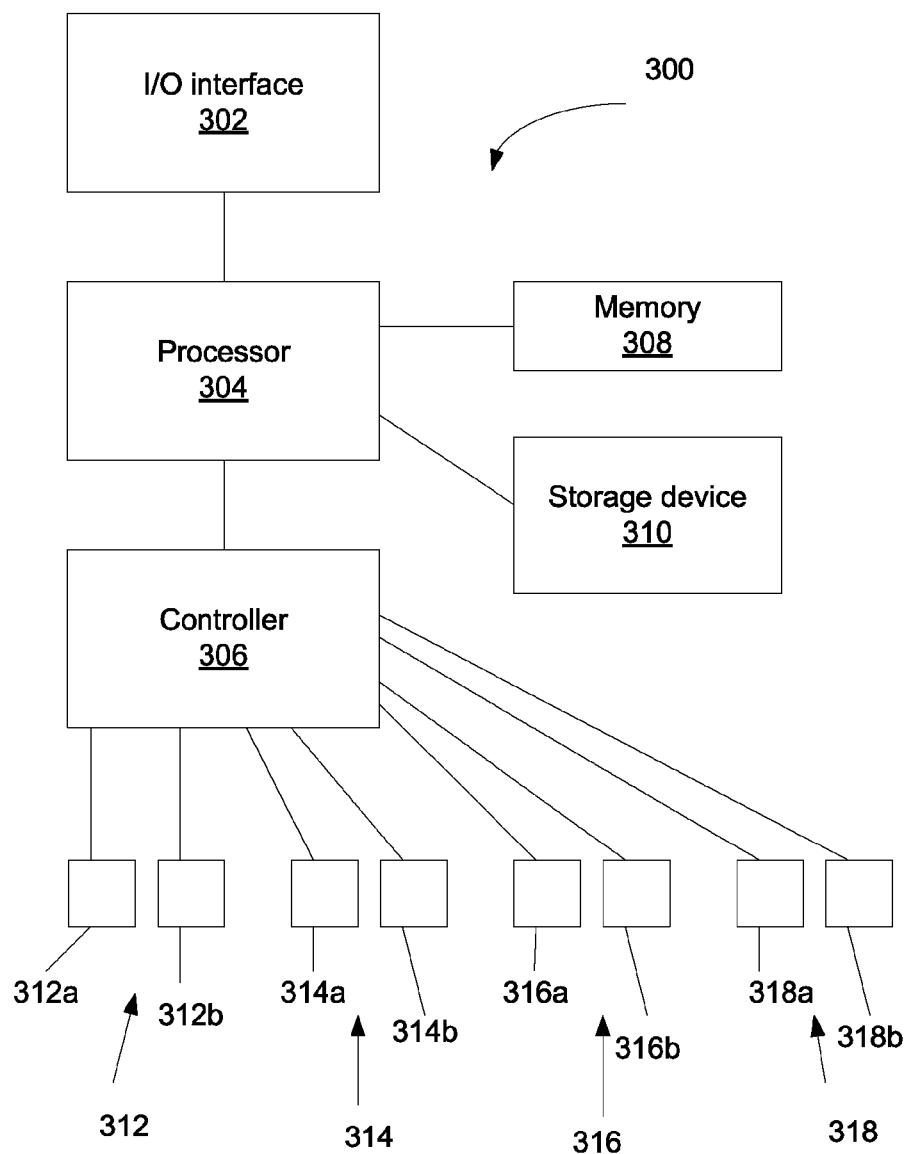
FIG. 3 illustrates a printing system for halftone printing in accordance with an example.

FIG. 3 illustrates a printing system 300 (e.g. printer) for halftone printing in accordance with an example. System 300 may include an input/output (I/O) interface 302 for receiving image data of an image that is to be printed. Processor 304 may communicate with Storage device 310, such as, for example, a hard disk, or any other non-transitory computer readable medium may be used to store a program that includes instructions executable by the processor for halftone printing. Memory 308 may be provided for storing temporal information in the course of execution of such program.

Four tandem single color printing element assemblies may be provided 312, 314, 316 and 318, each of which includes two printing elements—312a and 312b, 314a and 314b, 316a and 316b and 318a and 318b, respectively—designed to print a single color component of a color space (e.g. CMYK).

Processor 304 may be designed to process the image data to generate, for each printing element of a tandem single color printing element assemblies a halftone pattern for the image for that color, that was independently generated for that printing element and generate printing commands accordingly. Controller 306 may control the operation of the tandem single color printing element assemblies 312, 314, 316 and 318 accordingly, so as to cause printing, by each printing element, the halftone pattern that was independently generated for that printing element.

Figure 4:
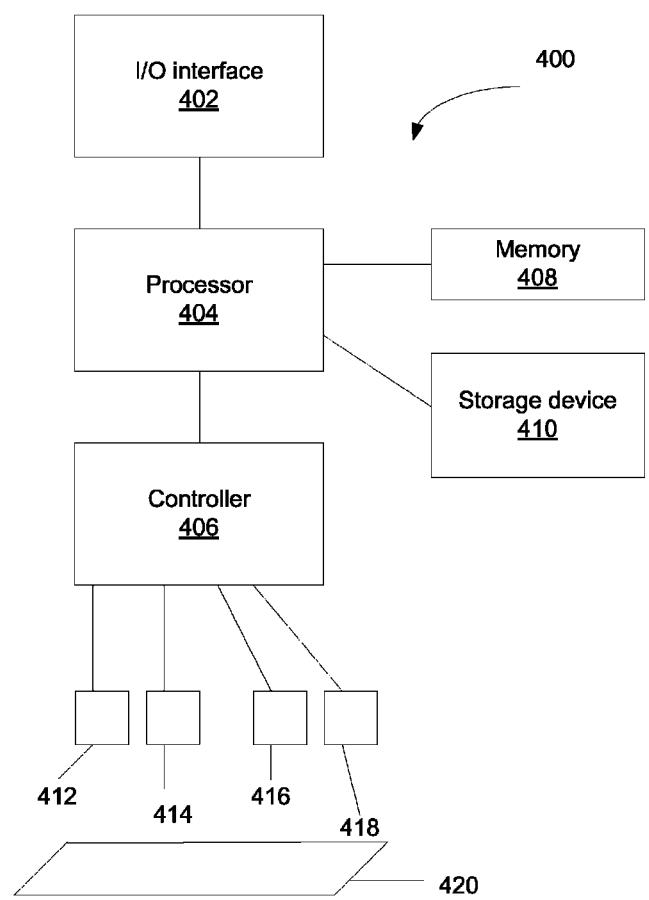
FIG. 4 illustrates a printing system for halftone printing, in accordance with another example.

FIG. 4 illustrates a printing system 400 (e.g. printer) for halftone printing, in accordance with another example. System 400 may include printing elements 412, 414, 416 and 418, which are each designed to print a single color component of a color space. Each printing element may be designed to pass over the print area 420 a plurality of passes when printing.

Processor 404 may be provided, capable of communicating with storage device 410 and memory 408. I/O interface 402 may be provided to receive image data of an image to be printed. Controller 406 may be provided to control the operation of the printing elements 412, 414, 416 and 418.

Processor 404 may be designed to process the image data to generate, for each pass of any of the printing elements 412, 414, 416 and 418 which is designed to pass a plurality of passes over print area 420 when printing that color component, a halftone pattern for the image for that color, that was independently generated for each pass.

Controller 406 may convey commands to each of the printing elements 412, 414, 416 and 418 to print the halftone pattern that was independently generated for each pass.

Aspects of the invention may be embodied in the form of a system, a method or a computer program product. Similarly, aspects of the invention may be embodied as hardware, software or a combination of both. Aspects of the invention may be embodied as a computer program product saved on one or more non-transitory computer readable medium (or mediums) in the form of computer readable program code embodied thereon. Such non-transitory computer readable medium may include instructions that when executed cause a processor to execute method steps in accordance with examples of the present invention. In some examples of the present invention the instructions stores on the computer readable medium may be in the form of an installed application and in the form of an installation package.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer, or on a plurality of computers.

Aspects of the invention are described hereinabove with reference to flowcharts and/or block diagrams depicting methods, systems and computer program products according to examples of the invention.

What is claimed is:

1. A method for halftone printing of image comprising:
   receiving image data of an image to be printed;
   processing the image data to generate, for each printing element of a plurality of printing elements which are designed to sharingly print a single color component of a color space, or for each pass of a single printing element which is designed to pass a plurality of passes over a single print area when printing that color component, a halftone pattern for the image for that color, that was independently generated for that printing element or for that pass, wherein processing the image data to generate the halftone pattern for the image for that color comprises running the image data through a separate linearization and halftoning process multiple times with a modified linearization function; and
   printing, by each printing element of the plurality of printing elements or in each pass of a single printing element, the halftone pattern that was independently generated for that printing element or for that pass.

2. The method of claim 1, wherein the independently generated halftone pattern for each printing element of the plurality of printing elements, or for each pass of the single printing element, is generated using a different halftoning method or by applying a transformation on the image data.

3. The method of claim 1, wherein a sum of the modified linearization functions for each printing element of the plurality of printing elements, or each of the passes of the plurality of passes, equals an original linearization function.

4. The method of claim 1, wherein initialization values of a halftoning operation used to generate the independently generated halftone pattern are modified, wherein said initialization values comprise at least one of an error weight distribution, a starting location, a pixel sequence for serial halftoning, a matrix to data offset for matrix halftoning, and a randomized seed value.

5. The method of claim 1, wherein for one or some of the plurality of printing elements, or for one or some passes of the plurality of passes, prior to generating the independently generated halftone pattern, the image data is rotated or flipped, and the independently generated halftone pattern is rotated or flipped back.

6. The method of claim 1, wherein halftoning of the image data is carried out in a desired final print resolution.

7. The method of claim 1, wherein generating the independently generated halftone pattern comprises transforming the image data.

8. The method of claim 7, wherein transforming the image data comprises at least one of changing an initial alignment of a halftoning matrix and splitting the image data into unequal pieces before halftoning.

9. The method of claim 8, wherein splitting the image data into unequal pieces comprises using unique linearization for each print element.

10. A non-transitory computer readable medium having stored thereon instructions for halftone printing, which when executed by a processor cause the processor to perform the method of:

receiving image data of an image to be printed;

processing the image data to generate, for each printing element of a plurality of printing elements which are designed to sharingly print a single color component of a color space, or for each pass of a single printing element which is designed to pass a plurality of passes over a single print area when printing that color component, a halftone pattern for the image for that color, that was independently generated for that printing element or for that pass, wherein processing the image data comprises transforming the image data before generating independently generated halftone patterns, wherein processing the image data to generate a halftone pattern for the image for that color, that was independently generated for that printing element or for that pass comprises running the image data through a separate linearization and halftoning process multiple times with a modified linearization function; and printing, by each printing element of the plurality of printing elements or in each pass of a single printing element, the halftone pattern that was independently generated for that printing element or for that pass.

11. The non-transitory computer readable medium of claim 10, wherein the independently generated halftone pattern comprises for each printing element of the plurality of printing elements, or for each pass of the single printing element, is generated using a different halftoning method or by applying a transformation on the image data.

12. The non-transitory computer readable medium of claim 11, wherein the different halftoning methods comprise changing randomization seed values, changing error distribution coefficients, changing pixel processing order, changing start location for halftoning, using an independent pixel expansion matrix per print element, or combinations thereof.

13. The non-transitory computer readable medium of claim 10, wherein initialization values of a halftoning operation used to generate the independently generated halftone pattern are modified, wherein said initialization values comprise at least one of an error weight distribution, a starting location, a pixel sequence for serial halftoning, a matrix to data offset for matrix halftoning, and a randomized seed value.

14. The non-transitory computer readable medium of claim 10, wherein for one or some of the plurality of printing elements, or for one or some passes of the plurality of passes, prior to generating the independently generated halftone pattern, the image data is rotated or flipped, and the independently generated halftone pattern is rotated or flipped back.

15. A system for halftone printing of an image, the system comprising:

an I/O interface for receiving image data of an image to be printed;

a plurality of single color printing element assemblies, each single color printing element assembly comprising a plurality of printing elements which are designed to sharingly print a single color component of a color space, or a single printing element which is designed to pass a plurality of passes over a single print area when printing that color component;

a processor for processing the image data to generate, for each printing element of the plurality of printing elements, or for each pass of the single printing element, a halftone pattern for the image for that color, that was independently generated for that printing element or for that pass, and for causing printing, by each printing element of the plurality of printing elements or in each pass of the single printing element, the halftone pattern that was independently generated for that printing element or for that pass, wherein the processor is designed, for one or some of the plurality of printing elements, or for one or sonic passes of the plurality of passes, prior to generating the independently generated halftone pattern, to rotate or flip the image data, and to rotate or flip back the independently generated halftone pattern.

16. The system of claim 15, wherein the independently generated halftone pattern for each printing element of the plurality of printing elements, or for each pass of the single printing element, is generated using a different halftoning method or by applying a transformation on the image data.

* * * * *

UNITED STATES PATENT AND TRADEMARK OFFICE
CERTIFICATE OF CORRECTION

PATENT NO. : 9,454,720 B2  
APPLICATION NO. : 14/351852  
DATED : September 27, 2016  
INVENTOR(S) : David Herbert Donovan Page 1 of 1

It is certified that error appears in the above-identified patent and that said Letters Patent is hereby corrected as shown below:

In the Claims

In Column 6, Line 14, in Claim 1, delete "of image" and insert -- of an image --, therefor.

In Column 8, Line 33 approx., in Claim 15, delete "sonic" and insert -- some --, therefor.

Signed and Sealed this
Seventh Day of March, 2017

Michelle K. Lee
*Director of the United States Patent and Trademark Office*